Sept. 20, 1966  L. P. BRISSETTE ETAL  3,273,286
VEHICLE BODY

Filed March 25, 1964  3 Sheets-Sheet 1

INVENTORS
Lawrence P. Brissette
BY & James D. Leslie
Herbert Furman
ATTORNEY

Sept. 20, 1966     L. P. BRISSETTE ETAL     3,273,286
VEHICLE BODY
Filed March 25, 1964     3 Sheets-Sheet 2
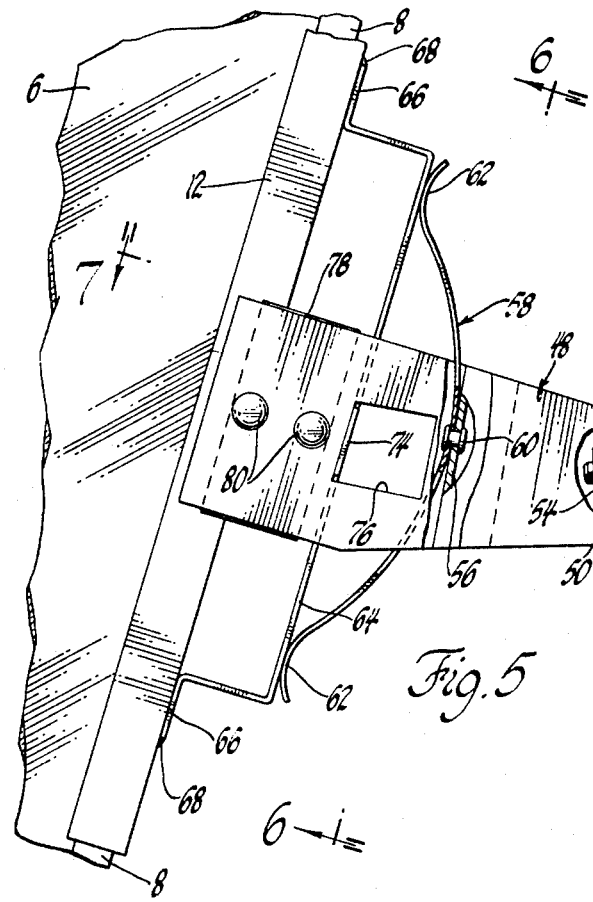
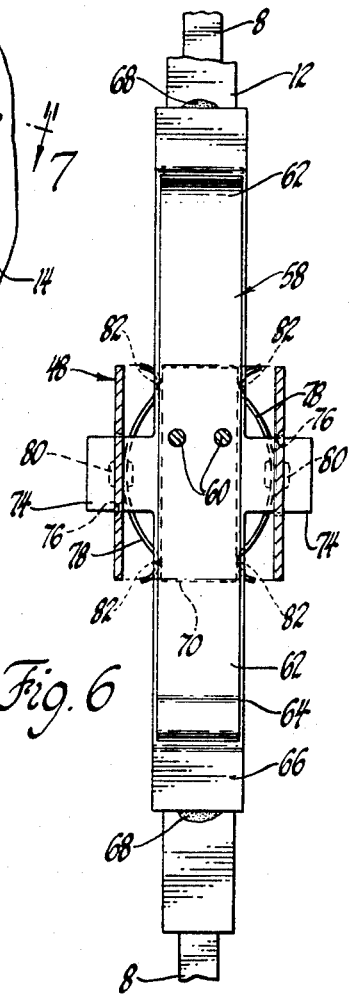
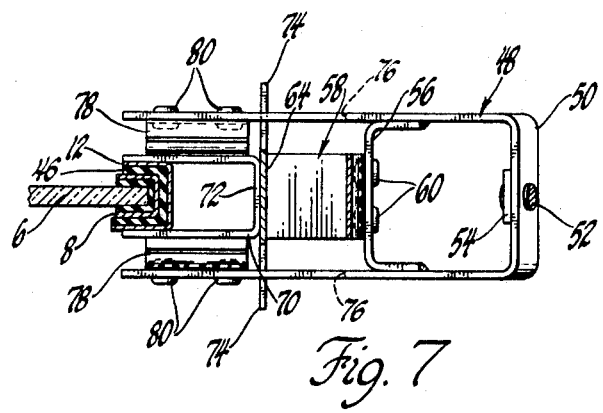
INVENTORS
Lawrence P. Brissette
BY & James D. Leslie
Herbert Furman
ATTORNEY Sept. 20, 1966    L. P. BRISSETTE ETAL    3,273,286
VEHICLE BODY
Filed March 25, 1964    3 Sheets-Sheet 3
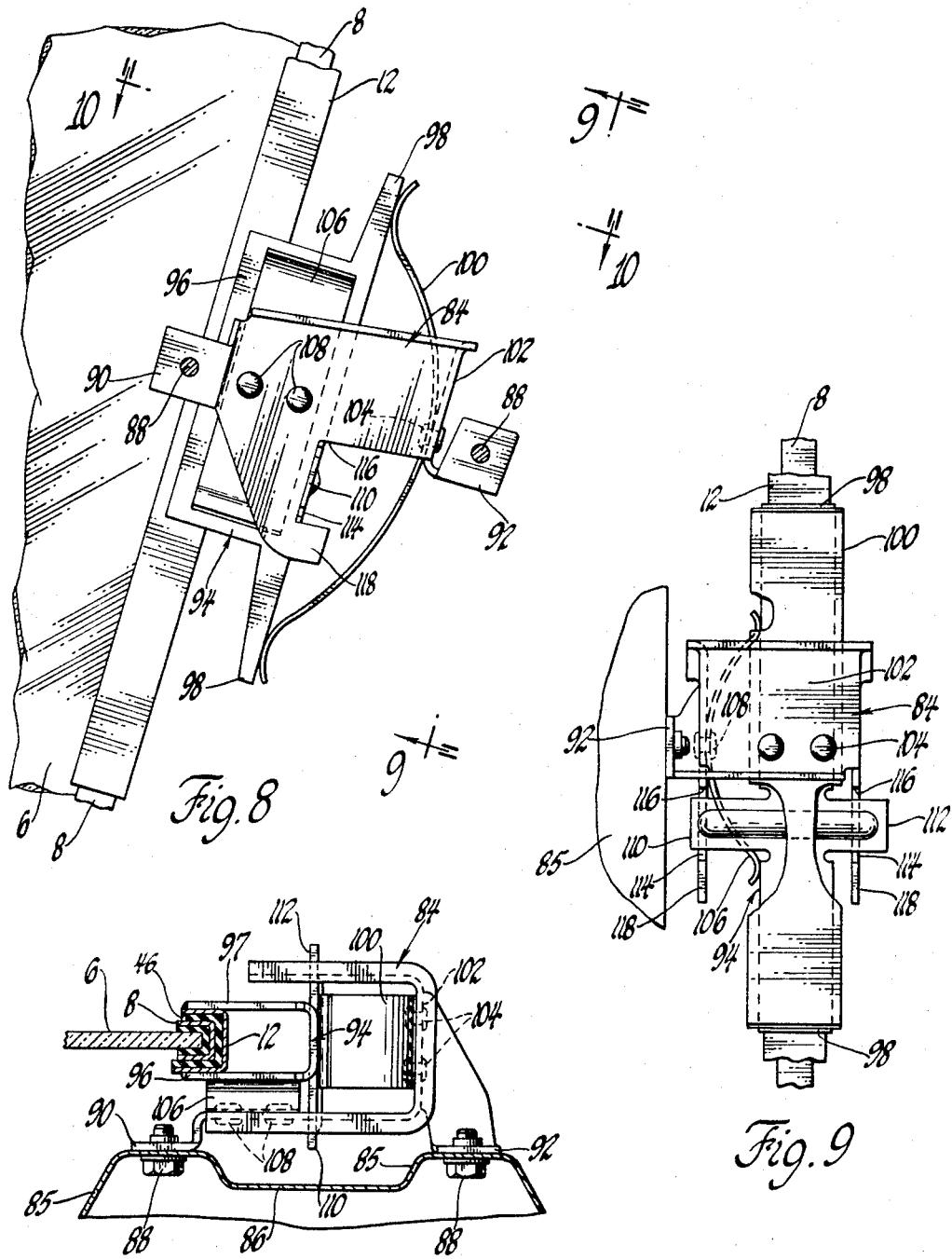
INVENTORS
Lawrence P. Brissette
BY & James D. Leslie
ATTORNEY United States Patent Office 3,273,286
Patented Sept. 20, 1966

3,273,286
VEHICLE BODY
Lawrence P. Brissette, Utica, and James D. Leslie, Birmingham, Mich., assignors to General Motors Corporation, Detroit, Mich., a corporation of Delaware
Filed Mar. 25, 1964, Ser. No. 354,655
3 Claims. (Cl. 49—227)

This invention relates to vehicle body construction, and more particularly to the supporting and guiding of the vertically slidable glass windows in either the body walls or in the vehicle doors.

In present day body construction, it is quite common for the window glass, in order to conform to the shape of the body, to have to slide upwardly or downwardly in an inclined path, or in some cases the window glass has to be of curved shape, and in either of these situations, difficulties are sometimes encountered in inserting the glass in the glass run channels when the body is being assembled, or in guiding the glass when it is being raised or lowered, so that there will be no binding action which would increase the amount of friction present.

It is therefore an object of the invention to provide a resilient or yielding supporting means for one of the glass run channels which will permit such channel to have a limited amount of movement when the window is being inserted in it during assembly, or is being raised or lowered during normal operation, in order that the glass run channel may be free to shift its position as necessary during such movement to align itself properly with the window glass to avoid any binding action between the two elements, so that the window may freely slide in the glass run channels at all times.

This is particularly desirable when the window is to be raised or lowered with power operated regulators, since in such installations any binding action which produces excessive amounts of friction may result in failure of the power operating mechanism to properly raise or lower the window.

Other objects of the invention will be apparent upon reference to the following description and accompanying drawings, in which:

FIGURE 5 is a view similar to FIGURE 2, but showing a modified form of the invention;

FIGURE 6 is a sectional view, take non the line 6—6 of FIGURE 5;

FIGURE 7 is a sectional view, taken on the line 7—7 of FIGURE 5;

FIGURE 8 is a view similar to FIGURE 2, but showing another modification of the invention;

FIGURE 9 is a sectional view, taken on the line 9—9 of FIGURE 8; and

FIGURE 10 is a sectional view, taken on the line 10—10 of FIGURE 8.

Figure 1:
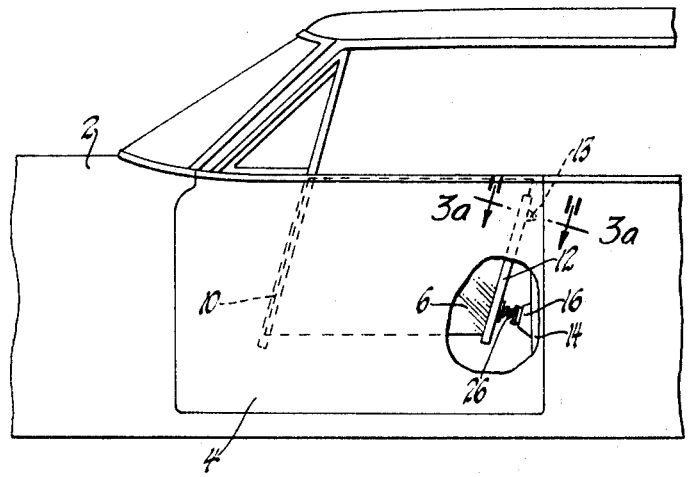
FIGURE 1 is a fragmentary side view of a vehicle body, with portions broken away to show the invention associated therewith.

Referring to FIGURE 1, 2 is a conventional vehicle body, having a door 4 within is mounted a window consisting of a glass 6 having a frame 8 secured around its edges. Since the window is adapted to be raised or lowered in the door, frame 8 is slidably mounted in a front guide or glass run channel 10 and in a rear guide or glass run channel 12. At its upper end, the rear glass run channel is secured to the door by any suitable form of pivotal support 13 which will permit the lower end of the glass run channel to move in either a fore and aft direction, or in an in and out direction with respect to the body.

Figure 3:
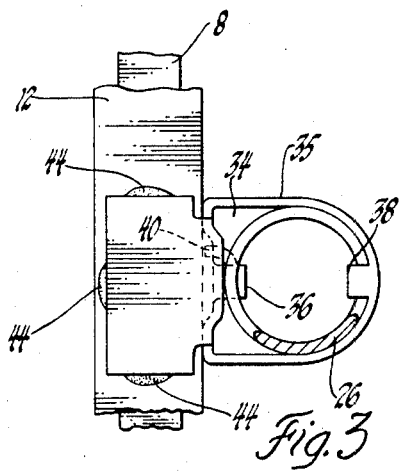
FIGURE 3 is a sectional view, taken on the line 3—3 of FIGURE 2.
Figure 3A:
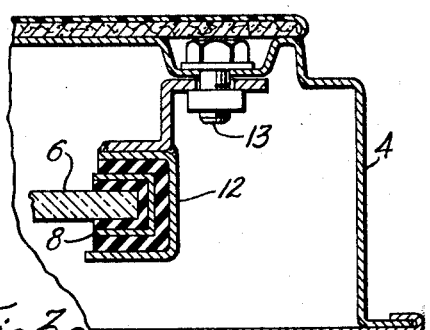
FIGURE 3a is an enlarged sectional view taken generally along line 3a—3a of FIGURE 1.

FIGURE 3a shows a suitable pivotal support which generally comprises an angle bracket secured to the upper end of the channel 12 and pivotally and slidably mounted on a bolt which is mounted on the inner panel of the door 4.

Figure 2:
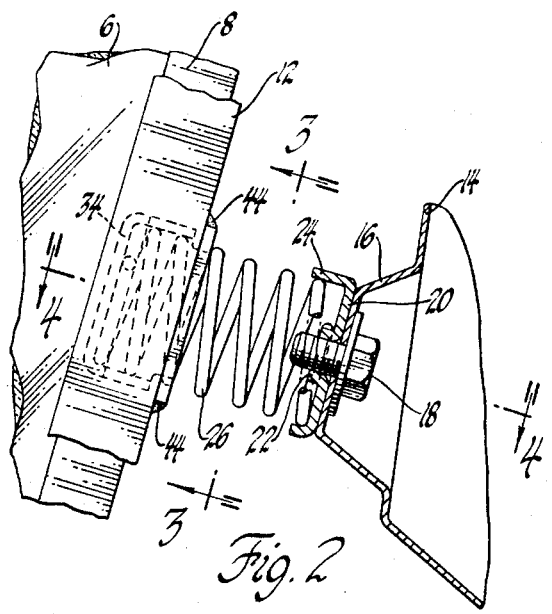
FIGURE 2 is an enlarged view of the portion which is broken away in FIGURE 1.
Figure 4:
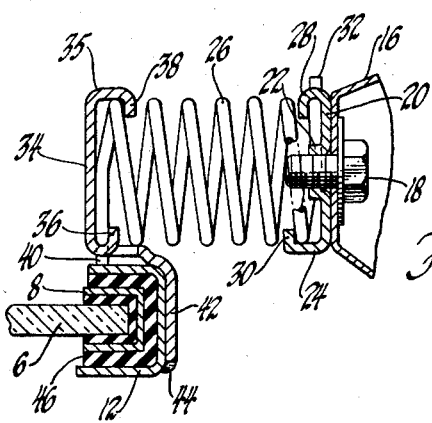
FIGURE 4 is a sectional view, taken on the line 4—4 of FIGURE 2.

One form of resilient or yielding supporting means for the glass guide channel is shown in FIGURES 2 to 4, wherein 14 is a portion of the door frame and 16 is a boss formed thereon. Secured to the boss by means of a bolt 18 is a spring seat 20, the bolt being threaded into the central portion 22 of the spring seat. 24 is a flange which is provided on the spring seat, and a coil spring 26 is located within the flange 24, portions 28 and 30 of the flange being bent over the end coil of the spring to hold it in the spring seat. The end 32 of the spring bears against the portion 28 to prevent the spring from turning with respect to the spring seat.

The other end of the spring 26 is seated in a support member 34 which has a flange 35 formed on it having portions 36 and 38 bent over the end coil of the spring to hold it in place therein, the end 40 of the spring bearing against the portion 36 to prevent turning of the spring with respect to the support member.

As best shown in FIGURE 4, the other end of the support member is bent to form a portion 42 which is welded as at 44 to the rear glass run channel 12, in which the window frame is slidably supported, there being suitable resilient material 46 secured in the glass run channel for the window frame to slide in with a minimum of friction.

It will be readily seen that with this resilient support, the rear glass run channel is free to move or float a limited amount in either fore and aft or in or out directions to permit the window to assume a position wherein it will be in proper alignment with the glass run channel and there will be no possibility of there being any binding action developing between it and the channel as it slides up or down in the latter. This is of importance not only when the window glass is being assembled in the glass run channels during manufacture of the vehicle body, to compensate for slight variations in the shape or dimensions of the parts, but also results in an easier operating window when the latter is being raised or lowered, due to the absence of any binding action between the window and the glass run channel.

In the modified form of the invention shown in FIGURES 5 to 7, a U-shaped frame 48 has its central portion 50 secured to the boss 16 on the door frame 14 by a bolt 52 which is threaded into a nut 54 welded to the central portion 50. Secured inside the frame 48 by welding is a bracket 56 to which the central portion of a leaf spring 58 is secured by rivets 60. The ends 62 of the spring 58 bear against a strap or bracket 64 which has its ends 66 welded to the glass run channel 12 at 68.

70 is a U-shaped striker member, the ends of which straddle and are secured to the glass run channel, and the central portion 72 of which bears against the bracket 64. The latter has projections 74 which extend outwardly through slots 76 formed in the legs of the U-shaped frame 48, to serve to guide the striker member as it tends to move sidewise with respect to the U-shaped frame 48. A leaf spring 78 is secured to each leg of the U-shaped frame by rivets 80, the free ends 82 of the springs 78 bearing against the striker member 70.

In this form of the invention, self-aligning movement of the glass run channel 12 is permitted by the action of the leaf springs, the leaf spring 58 becoming compressed should the glass run channel tend to move in a fore and aft direction, and one or the other of the leaf springs 78 becoming compressed to permit in or out movement with respect to the door. It will be readily seen that this type of mounting will permit the same floating movement which will enable the glass run channel to adapt itself to whatever position is necessary in order to align itself properly with the window when the latter is being assembled in position in the door, or when the window is being raised or lowered during normal operation.

In the modified form of the invention shown in FIGURES 8 to 10, a generally U-shaped frame member 84 formed of sheet metal is secured to bosses 85 formed on the inside of the door panel 86 by bolts 88 which are threaded into legs 90 and 92 of the frame member. 94 is a U-shaped striker member between the legs 96 and 97 of which the glass run channel 12 is received and secured thereto. The central portion of the striker member has extensions 98 formed on it, and the free ends of a leaf spring 100 bear against these extensions, the central portion of the spring 100 being secured to the portion 102 of the frame member 84 by rivets 104. This portion of the structure provides for fore and aft movement of the glass run channel 12 with respect to the door, the leaf spring 100 being adapted to be compressed to permit such movement.

106 is another leaf spring, the central portion of which is secured to one of the legs of the bracket 84 by rivets 108, and the free ends of which are adapted to bear against the leg 96 of the striker member 94. The function of this portion of the structure is to permit in or out movement of the glass run channel 12 with respect to the door, the leaf spring 106 being adapted to be compressed to permit such movement when the glass run channel moves in either of such directions to align itself properly with the window when the latter is being inserted in the glass run channel, or when the window is being raised or lowered.

To guide the striker member 94 during such in or out movement, and to prevent undesirable up or down movement thereof, it has extensions 110 and 112 formed on it, such extensions being held in a space 114 formed between shoulders 116 and projections 118 provided on the bracket 84. It will be readily seen that this will permit in or out movement of the striker member with respect to the door, but will prevent up or down movement of the striker member with respect to the door. Such permitted aligning movement of the glass run channel 12 reduces the possibility of any binding action between the window and the glass run channel, reduces friction between these two elements, and also reduces noise, such as squeaking, caused by movement of the window relative to the glass run channel.

While specific embodiments of the invention have been shown and described, it will be understood that various changes in design or arrangement of the parts may be made without departing from the spirit and scope of the appended claims.

We claim:
1. In a vehicle body having a window opening therein and a window for closing said opening, the combination comprising, guide means mounted on said body for guiding one edge portion of said window along a predetermined path upon movement of said window between open and closed positions, a guide member for guiding an opposite edge portion of the window, means pivotally mounting said guide member adjacent one end thereof on said body, said pivot means permitting said window, upon movement thereof, to move said guide member relative to said pivot means longitudinally of the path of movement of the window, laterally of the path of movement of the window, or both longitudinally and laterally of the path of movement of the window as required to align said guide member with said window during movement thereof, and resilient means interconnecting said guide member adjacent an opposite end thereof and said body and providing a floating connection therebetween, said resilient means locating said guide member in a predetermined position both laterally and longitudinally of the path of movement of the window and resisting movement of said guide member from said position by said window during movement thereof.

2. The combination recited in claim 1 wherein said resilient means comprises a coil compression spring seating between said body and said guide member and providing the sole interconnection therebetween.

3. The combination recited in claim 1 wherein said resilient means comprises a coil compression spring seating between said body and said guide member and providing the sole interconnection therebetween, said coil spring having a line of force extending longitudinally of the window.

References Cited by the Examiner
UNITED STATES PATENTS

| | | | |
|---|---|---|---|
| 1,680,886 | 8/1928 | Janoir | 296—48 |
| 1,808,699 | 6/1931 | Watkins | 296—44.5 |
| 2,761,182 | 9/1956 | Love | 20—52.2 X |

BENJAMIN HERSH, *Primary Examiner.*

P. GOODMAN, *Assistant Examiner.*